US008186311B2

(12) United States Patent
Longo (10) Patent No.: US 8,186,311 B2
(45) Date of Patent: May 29, 2012

(54) DOG LEASH ASSEMBLY (76) Inventor: Stephen Longo, Northport, NY (US)

( * ) Notice: Subject to any disclaimer, the term of this patent is extended or adjusted under 35 U.S.C. 154(b) by 128 days.

(21) Appl. No.: 12/653,062

(22) Filed: Dec. 9, 2009

(65) Prior Publication Data
US 2010/0326370 A1 Dec. 30, 2010

Related U.S. Application Data (62) Division of application No. 11/477,147, filed on Jun. 29, 2006, now abandoned.

(51) Int. Cl.
*A01K 27/00* (2006.01)
(52) U.S. Cl. ............. 119/868; 119/858; 119/795; 59/95
(58) Field of Classification Search ................. 119/795, 119/769, 858, 792, 868, 770, 787, 791; D30/151, D30/153; 24/905; 59/95
See application file for complete search history.

(56) References Cited

U.S. PATENT DOCUMENTS

| 2,633,375 | A | * | 3/1953 | Wilcoxon | ................ 403/6 |
| 2,947,456 | A | | 8/1960 | Seron | |
| 2,994,300 | A | * | 8/1961 | Grahling | ............ 119/770 |
| 4,955,749 | A | | 9/1990 | Panovic | |
| 5,450,661 | A | * | 9/1995 | Rekuc | .............. 24/599.6 |
| 6,029,611 | A | | 2/2000 | Hershauer | |
| 6,240,881 | B1 | | 6/2001 | Edwards et al. | |
| 6,530,345 | B2 | | 3/2003 | Donze | |
| 2002/0026890 | A1 | | 3/2002 | Zook et al. | |

OTHER PUBLICATIONS

Inter. Search Report, Oct. 3, 2008.
Written Opinion of the Inter.Search. Authority, Oct. 3, 2008.

* cited by examiner

*Primary Examiner* — Kristen C Hayes
(74) *Attorney, Agent, or Firm* — Leo G. Lenna (57) ABSTRACT A leash assembly designed to attach at least one waste holding device, such as a plastic bag, in such a manner that the plastic bag is able to swivel about and not get tangled as the dog moves from side to side. This eliminates the need of the person walking the dog to constantly move the leash from one hand to the other hand in order to prevent the waste bag from getting tangled. In other words, as the dog move in different directions the waste bag holding device is able to adjust its' position by swiveling about the device attached to the leash allowing the walker to have their hands free. The swivel can also be adapted to hold other items such as keys, extra bags for dog cleanup and hand wipes. All of these items would also be able to swivel about the device. The present invention eliminates the need for the person walking the dog from carrying the waste bag and switching the bag from hand to hand as the dog moves from side to side until a waste receptacle is reached that the waste can be disposed of properly.

10 Claims, 7 Drawing Sheets

DOG LEASH ASSEMBLY

CROSS REFERENCE TO RELATED APPLICATIONS

This is a divisional application of U.S. patent application Ser. No. 11/477,147, now abandoned, filed on Jun. 29, 2006, the contents of which are incorporated herein by reference in its entirety.

BACKGROUND OF THE INVENTION

It is widely known that there are millions of dog owners in this country as well as other countries throughout the world. Dogs comprise one of the most popular types of animals for household pets. Of course, dogs are extremely popular animals for other than simple companionship. Other uses of dogs include working dogs and show dogs. In turn, working dogs may be classified as dogs utilized for police enforcement purposes, military activities, dogs trained for hunting and also dogs specifically trained to aid those individuals who are visually impaired.

Regardless of the above classifications, the care and maintenance of dogs require the use of numerous auxiliary or supplementary items. Among the most popular is the dog leash or tethering apparatus wherein dogs are retained and/or restricted for purposes of control when not contained by fences in a yard or like area. Since, all dogs must go to the bathroom and often are walked in public areas where the owner is required by law to clean up after his or her dog, many different devices are available on the market to pick up after a dog but often these devices are bulky and cumbersome to carry. That is why the majority of dog owners often carry a plastic bag that when inserted inside out can be used to pick up the dog waste made by the dog and contain it in the bag until the bag can be disposed of in a proper receptacle. However, one problem that exists with this system is where to store the bag containing the dog waste while walking the dog. One certainly does not want to put it in their pocket until a receptacle is reached.

Accordingly, most often the person walking the dog carry the bag containing the dog waste in his or her hands. However, as the dog moves from side to side, that person must compensate for the movement by switching the leash from one hand to the other hand. This means that the bag containing the waste must also be shifted from one hand to the other making it cumbersome, messy and facilitating the transfer of germs from one hand to the other. Not to mention, requiring that both hands of the person walking the dog be fully occupied, one with the leash and one with the bag. This makes it difficult to carry anything else, press crosswalk buttons, open doors and/or fences, and even prevent injury should the person walking the dog trips and fall. The problem of having both hands full while walking the dog has been addressed by leash and retaining harness assemblies and devices such as harnesses. Harnesses have been proposed to address this problem, but seem to be even more constraining than having both hands full.

Accordingly, there is a recognized need in this area for a leash or tethering assembly device that can easily attach and detach a bag for carrying dog waste. The device used to hold the dog waste must be designed to remain untangled as the leash is switched from hand to hand as the dog moves from side to side. In other words, a device attached to a leash that allows a bag to be attached to the device and the bag remains attached without becoming a tangled mess. This allows the walker to have at least one hand free at all times. Such a preferred leash assembly should be structured so that the waste bag can be quickly attached and detached using one hand.

The present invention is directed to a dog leash attachment assembly designed to carry items, such as a bag containing dog waste, without getting tangled as the dog moves from side to side. The dog leash attachment assembly contains a bag attachment means that is able to swivel about the device in such a manner so as to allow the bag containing the waste to remain in an untangled position as the dog moves from side to side and the person holding the leash switches the leash from hand to hand. The present device makes walking a dog more enjoyable and prevents possible injuries that can occur to the hands and/or arm muscles of the person walking the dog as the leash and bag is switched from hand to hand as the dog pulls in the forward direction. Accordingly, the present invention fulfils this need and overcomes the shortcomings of the problems discussed above as well as others.

SUMMARY OF THE INVENTION

The present invention is directed to a leash comprising a means for attaching a bag and/or holding device. The means for attaching the bag and/or holding device is configured in a rotatable configuration with the leash. This configuration must allow the means for attaching a bag to rotate freely about a fixed axis so as to keep the bag in a fixed range of motion as the leash is moved from side to side. In other words, as the leash is passed from hand to hand as the dog moves from one side to the other, the bag attached to the holding means of the leash will pivot about the axis of the leash and the bag will remain untangled in a fixed range of motion. Mostly, with the heaviest portion of the bag and/or holding device will remain closest to the ground according the laws of gravity.

Another embodiment of the present invention is directed to a leash attachment for carrying items comprising a leash attachment means for attaching to a leash in a fixed position. The leash attachment means being configured so that it can be adjusted to additional fixed positions on the leash. The leash attachment means further comprising a means for attaching a bag and/or holding device that is configured so as to be in rotatable communication with the leash attachment means so that the means for attaching a bag and/or holding device can rotate about a fixed axis and keep the bag in a fixed range of motion without getting tangled. This device can be used with an existing leash and provides the same benefits as the leash described above without purchasing a completely new leash.

A kit is also available that contains the leash, an attachment means and bags that attach to the holding means of the leash attachment.

The invention is further described by the figures and the detailed description below.

DETAILED DESCRIPTION OF THE INVENTION

In most communities today the dog walker walking the dog is required, by law, to clean up after their dog after it is done and dispose of the droppings into a proper garbage disposal. In places where cleaning up after your dog is not the law, many owners do so anyway out of common courtesy. Often the walker of the dog uses a plastic bag inverted inside out to pick up the waste until they can get to a waste disposal receptacle. Often that means the dog walker is left carrying the bag of dog waste for blocks. To make it even more difficult, as the dog runs from side to side, the dog walker must constantly switch hands with the leash forcing the walker to also switch hands with the bag of dog waste. This is not only an undesirable task, it is also not hygienic.

One alternative is to place the dog waste into a bag and attach it to a part of the walker's body so as to leave the walker's hands free to maneuver the leash. However, keeping dog waste in a bag for several blocks in the heat makes it unlikely that the bag can be used over and over again without washing it every time it is used so as to avoid germ transmission and to prevent it from smelling. This therefore seems to be more work than it is worth. If a plastic bag is used, the next question is who wants to walk several blocks with a plastic bag full of smelly dog waste attached to their body? This therefore makes this an unlikely alternative to carry the bag.

The present invention, however, offers a smart inexpensive way to solving this problem. The present invention provides an apparatus that allows the walker to simply attach the disposal bag used to pick up the waste secure it to the leash so as to leave the walker's hands free and keep the waste as far away from the walker's personal space as possible.

The present invention is directed to a leash comprising a means for attaching a bag and/or holding device. The bag or holding device can be a plastic bag that is normally used to pick-up after a dog or can be a plastic washable container that has a place for attachment. The means for attaching the bag and/or holding device is designed to attach the bag and/or holding device securely to the leash so that it does not dislodge while the dog runs about during the walk. In addition, the means for attaching the bag and/or holding device is configured so that it rotates about the leash.

In other words, the bag and/or holding device is rotatably attached to the leash so that it does not get tangled as the dog runs from side to side. Instead, the holding device is configured to freely rotate about a fixed axis so as to keep the bag and/or holding device in a fixed range of motion as the leash is moved from side to side. In other words, the heaviest portion of the bag and/or holding device would most likely remain closest to the ground according to the laws of gravity.

Figure 1:
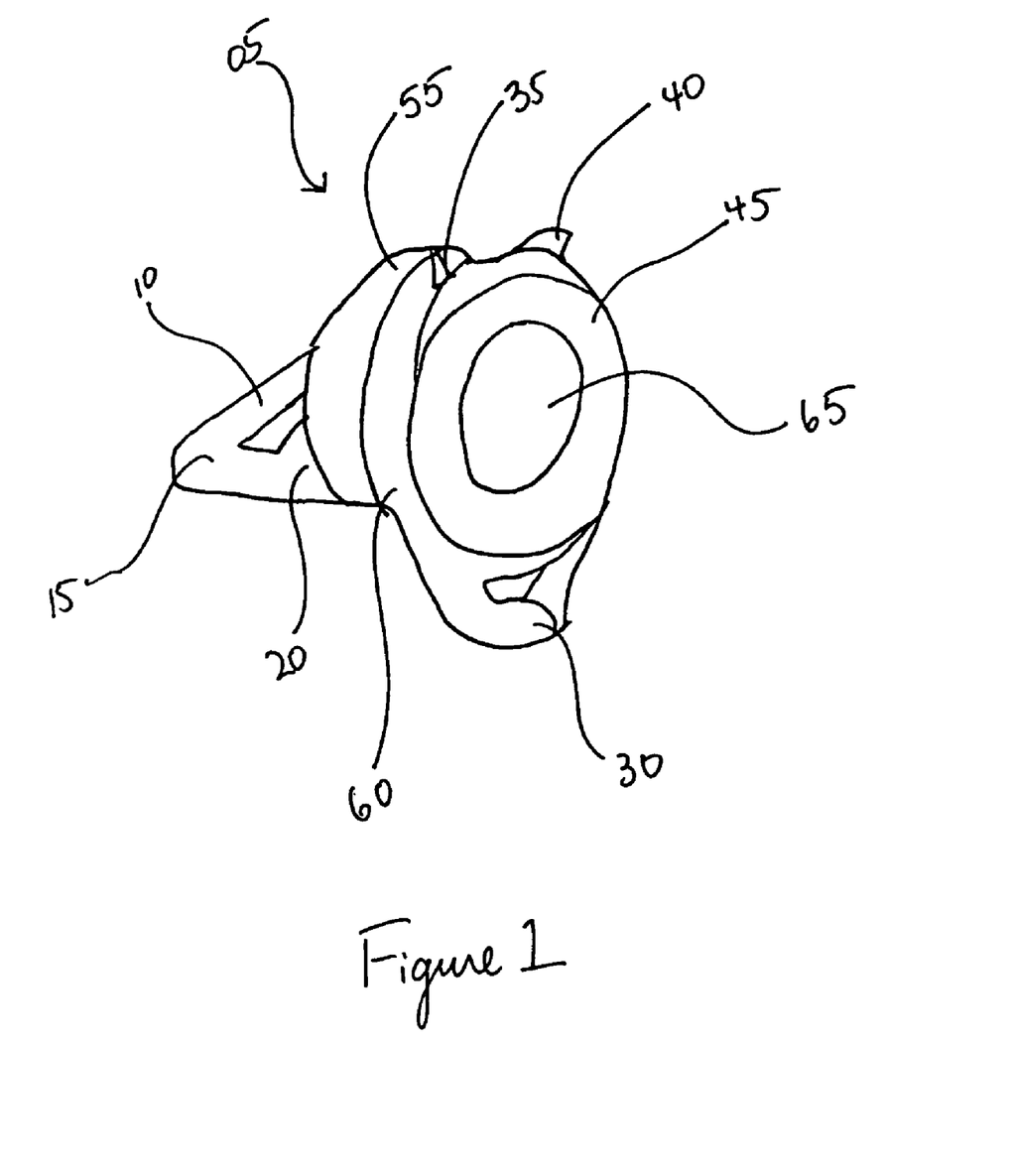
FIG. 1 is a side view of the leash attachment for carrying items of the present invention.
(05) leash attachment for carrying items
(10) leash attachment means
(15) first segment of leash attachment
(20) second segment of leash attachment
(25) third segment of leash attachment
(30) attaching a bag and/or holding device
(35) first portion
(40) second portion
(45) front portion of concentric ring
(55) rear portion of concentric ring (60) center groove portion
(65) leash pass through FIG. 2 is a side view of one form of the leash attachment portion of the present invention.
(15) first segment of leash attachment
(20) second segment of leash attachment
(25) third segment of leash attachment

The invention is shown in FIGS. 1-7. One embodiment of the present invention is directed to a leash attachment for carrying items as shown in FIG. 1. FIG. 1 shows a side view of the leash attachment for carrying items of the present invention (05). The leash attachment (05) comprises a leash attachment means for attaching to a leash in a fixed position (10). The attachment means (10) is configured so that it can be adjusted to additional fixed positions on the leash and once a desired position is reached, the leash attachment (10) can stay affixed to the leash in that fixed position.

Figure 2:
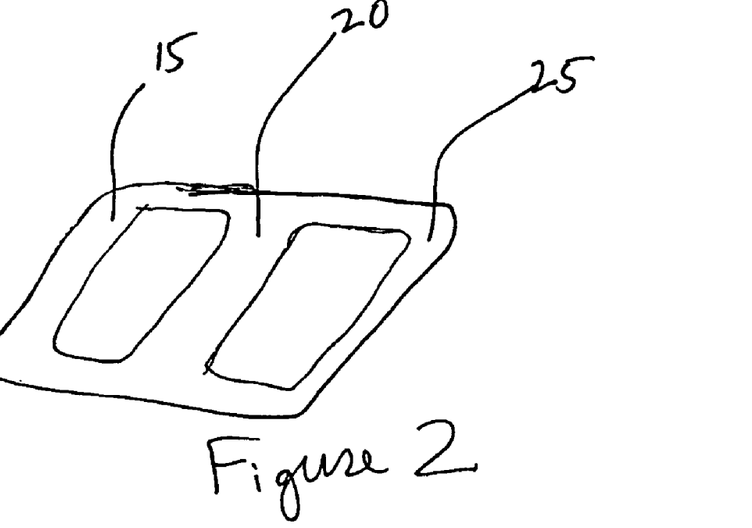
Figure 3:
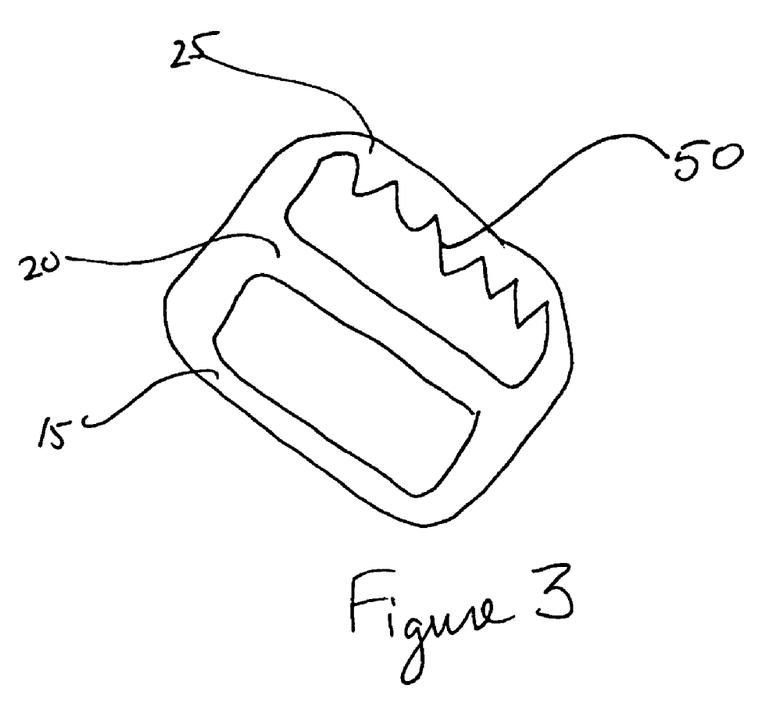
FIG. 3 is a side view of an alternative leash attachment portion of the leash attachment for carrying items of the present invention.
(15) first segment of leash attachment
(20) second segment of leash attachment
(25) third segment of leash attachment
(50) teeth FIG. 4 a full side view of the leash attachment of the present invention.
(05) leash attachment for carrying items
(10) leash attachment means
(15) first segment of leash attachment
(20) second segment of leash attachment
(25) third segment of leash attachment
(45) front portion of concentric ring
(55) rear portion of concentric ring
(60) center groove portion
(65) leash pass through FIG. 5 shows a front view of the leash attachment (05) of the present invention.
(05) leash attachment for carrying items
(10) leash attachment means
(45) front portion of concentric ring
(65) leash pass through
(70) closed loop
(90) closed loop attachment means

The leash attachment means (10) can be in the form of a belt buckle as shown in FIGS. 2 and 3 having at least a first (15), a second (20) and a third segment (25) connected together in a spaced arrangement whereby a leash and/or a strap can be passed under or over the first segment (15), then over or under the second segment (20), and back under or over the third segment (25) so as to secure the leash attachment means (10) to the leash. In an alternative embodiment shown in FIG. 3, the third segment (25) can be further equipped with teeth (50) that are designed to grasp the leash and prevent the leash attachment (05) from slipping.

The leash attachment (05) for carrying items according to the present invention further comprises a means for attaching a bag and/or a holding device (30). The means for attaching a bag and/or holding device (30) is attached to the leash attachment means (10) in such a way that it is able to rotate about the leash attachment means (10) in order to assure that the bag remains untangled as the leash is passed from hand to hand. In other words, the means for attaching a bag and/or a holding device (30) is configured so that the means for attaching a bag and/or a holding device (10) can rotate about a fixed axis so as to keep the bag and/or a holding device in a fixed range of motion.

As shown in FIG. 1, the means for attaching a bag and/or holding device (30) may comprises a first portion (35)

attached to the leash attachment means (10) in at least one fixed position, a second portion (40) is either directly attached or in communication with the first portion (35) so that the first and second portions are configured in a rotatable manner. When the first portion (35) and the second portion (40) are in direct communication they form a bag and/or holding device attachment means (30) for attaching a bag and/or holding device. This holding device attachment means (30) can be configured to be a clip, a hook, a bracket, a pinch clip, a pressure slide, a mechanical clasp, a magnetic clasp, or any other type of holding device that can be used to attach a bag firmly and securely. In the addition, the holding means (30) is designed so that the holding means can be manipulated so as to release the bag when desired requiring only a limited motion on the part of the person removing the bag.

In another embodiment of the present invention, the holding means (30) sits within a center groove portion (60) defined by a front portion concentric ring (45) and a rear portion concentric ring (55). In one embodiment of the invention, the holding device attachment means (30) is a closed clasp that is configured to lock in a bag and/or holding device that contains a ring-type configuration. However, as mentioned above any type of holding means will work as long as it securely holds a bag or holding device when in one position and releases the bag when in another position.

The holding means (30) is also configured with a leash pass through (60) that allows a leash to be threaded through so that it can be passed through the buckle so as to secure the leash in place without affecting the operation of the holding means (30).

The holding means (30) may also be configured to allow the first and second portions (35, 40) of the holding means to move freely over the surface of the concentric groove in which they rest. In other words, the surface of the first portion (35), second portion (40) and the surface of the center groove of the of the bag and/or holding device attachment means (30) can further contain a reduced friction coating that allows the first and second portions (35, 40) of the bag and/or holding device attachment means (30) to freely slide over one another. The coating can be made from a reduced friction rubber and/or plastic or can be a nonstick material such as Teflon® or Silverstone® coating. In the alternative, the surfaces can be coated with oils or powders so as to reduce the friction between the surfaces.

In another embodiment of the invention, the attachment means (30) can be configured to contain a ball bearing system positioned between the first and second portions (35, 40 as shown in FIG. 1) of the attachment means (30). This configuration would allow the first and second portions (35, 40 as shown in FIG. 1) to freely rotate about the axis of the leash attachment (05). Consistent with the main objective of the invention, this configuration would maintain the bag positioned in the holding device (30) in a fixed range of motion as the leash is moved about, thus preventing the bag from becoming tangled.

Figure 4:
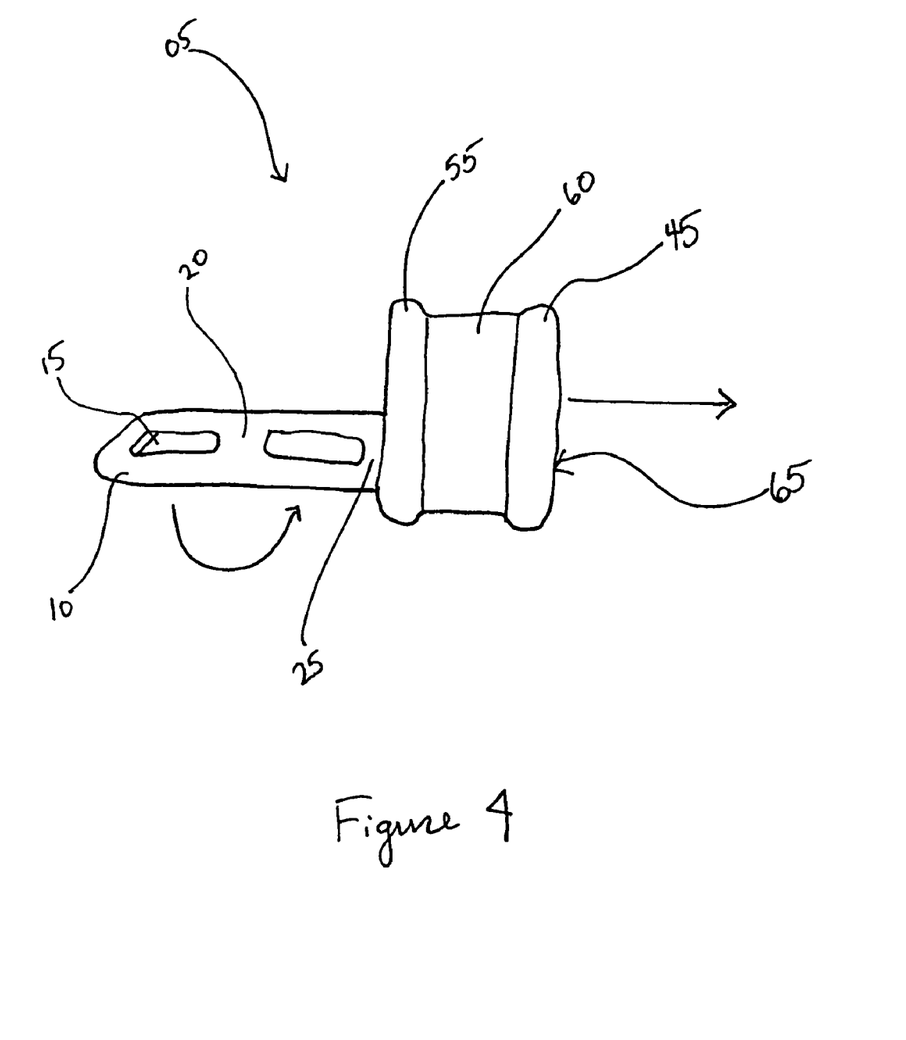

FIG. 4 shows a full side view of the leash attachment (05) of the present invention without the first and second portions (35, 40) of the holding means (30) attached. This view clearly shows the front and rear portions of the concentric ring (45, 55) and the center groove portion (60) of the holding means (30) in which the first and second portions (35, 40) of the concentric rings are positioned in order to form the holding means (30). As stated above, the first and second portions of the holding means fit into the center groove portion (60) to form the holding mans (30) of the leash attachment device of the present invention.

Figure 5:
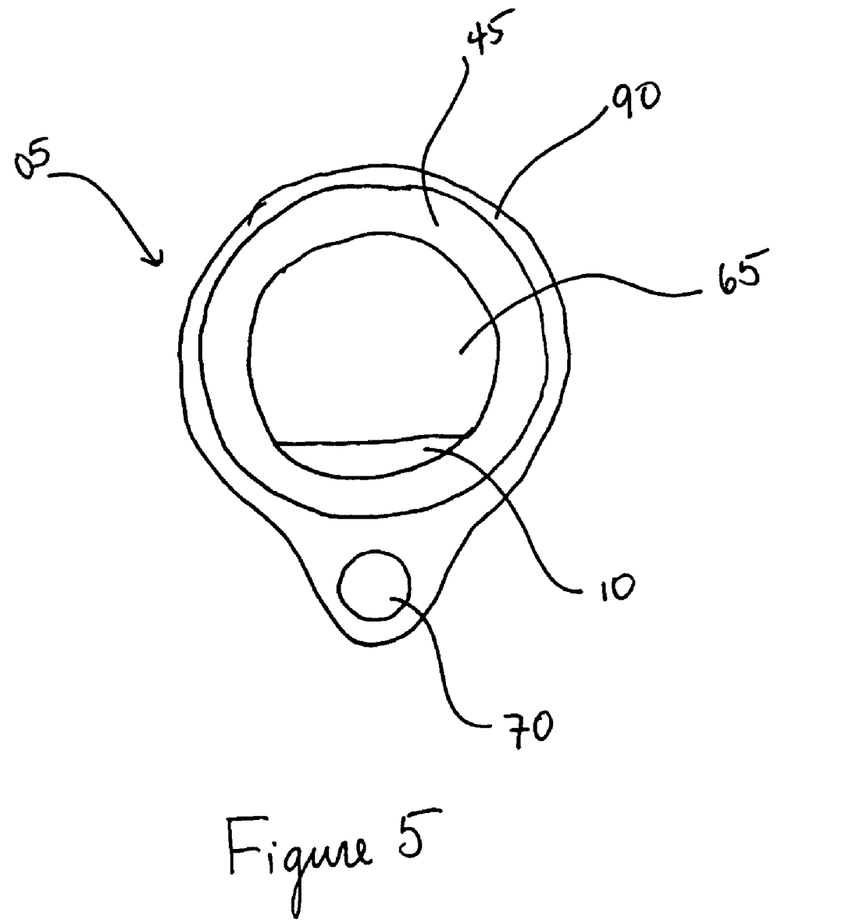

FIG. 5 shows a front view of the leash attachment (05) of the present invention. This view clearly shows the leash pass through (65) of the leash attachment (05), which is used to thread through in order to attach the leash attachment (05) to a leash. This view also shows an alternative embodiment of the holding means (90), which consist of a single portion that is molded with a closed loop (70). The closed loop can be used to attach, hook or tie a bag to the closed loop (70). In the alternative, the closed loop can be used to attach a clamping means shown in FIGS. 6 and 6a.

Figure 6:
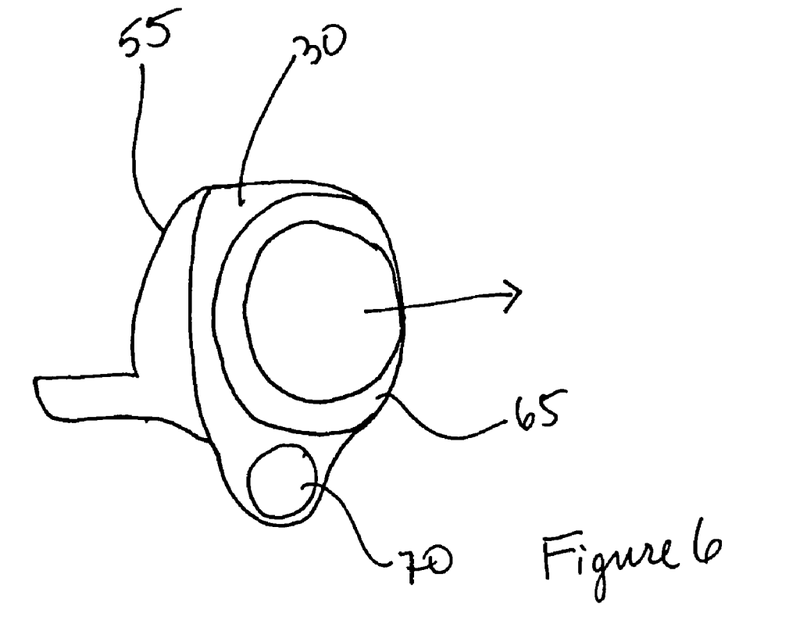
FIG. 6 is a side view of the present invention.
(75) first portion
(80) second portion

The clamping means of FIG. 6 comprises a first portion (75) and a second portion (80) that are attached together by pivot means (85). The distant between the first and second portions (75, 80) is determined by the diameter of pivot means (85) and is designed to be very narrow and to have a memory so that the two portions can be pried apart and a portion of a bag slide between them. When the two portions are released they attempt to return back to their original position and grasp the bag portion tightly between. The tight fit holds the bag in position as it is jostled about as the leash is moved from side to side.

Figure 6A:
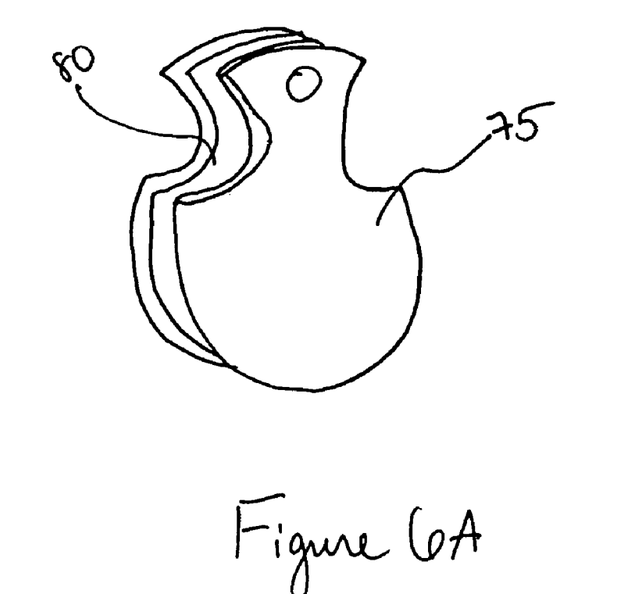
FIG. 6a is a schematic diagram showing how the clamp fits in the closed loop (70).

To release the bag, the bag can be pulled down with force so as to pry the bag out of the clamp and/or the two portions of the clamp can be pried open and the bag released. As one skilled in the art would realize, many alternative holding means can be envisioned and as long as they hold and release a bag or holding device, they are envisioned to fall within the scope of the invention and do not depart from the inventive spirit of the invention. FIG. 6a is a schematic diagram showing how the clamp of FIG. 6 can be designed to fit into the closed loop (70) of the single portion holding means (30).

Figure 7:
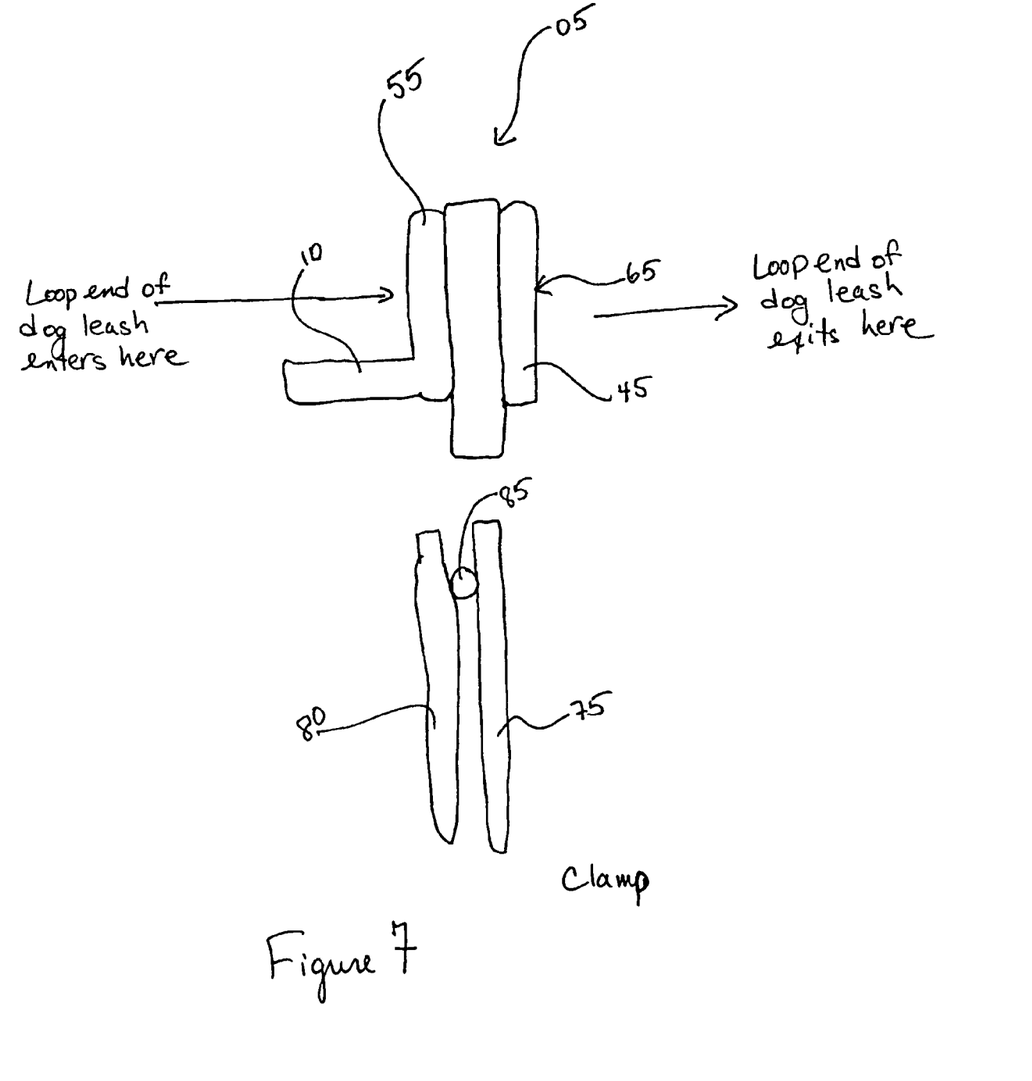
FIG. 7 is a side view of the leash attachment and clamp portion of the present invention.
(05) leash attachment for carrying items
(10) leash attachment means
(45) front portion of concentric ring
(55) rear portion of concentric ring
(65) leash pass through
(85) pivot means

Finally, FIG. 7 shows a side view of the present invention showing the positioning of the front concentric ring (45) the rear concentric ring (55) and the attachment means positioned within the center groove (60).

The leash attachment device can be made from leather, vinyl, plastic, rubber, polyurethane, polyvinyl carbonate (PVC), metal, man-made materials, and combinations thereof or any other material that can be used to form the leash attachment (05) of the present invention. The leash attachment (05) can be made by pour and mold processes, dropped forging, cladding, piece assembly, or any other process known in the art.

The leash attachment device can be sold as a kit that includes a leash, the leash attachment device, and disposable bags that can be used to pick-up the dog waste, attached to the holding means and disposed of in a proper waste disposal. Each of the embodiments can also be configured with additional compartments and/or attachment means for keys, additional bags, wipes and the like.

Figure 8:
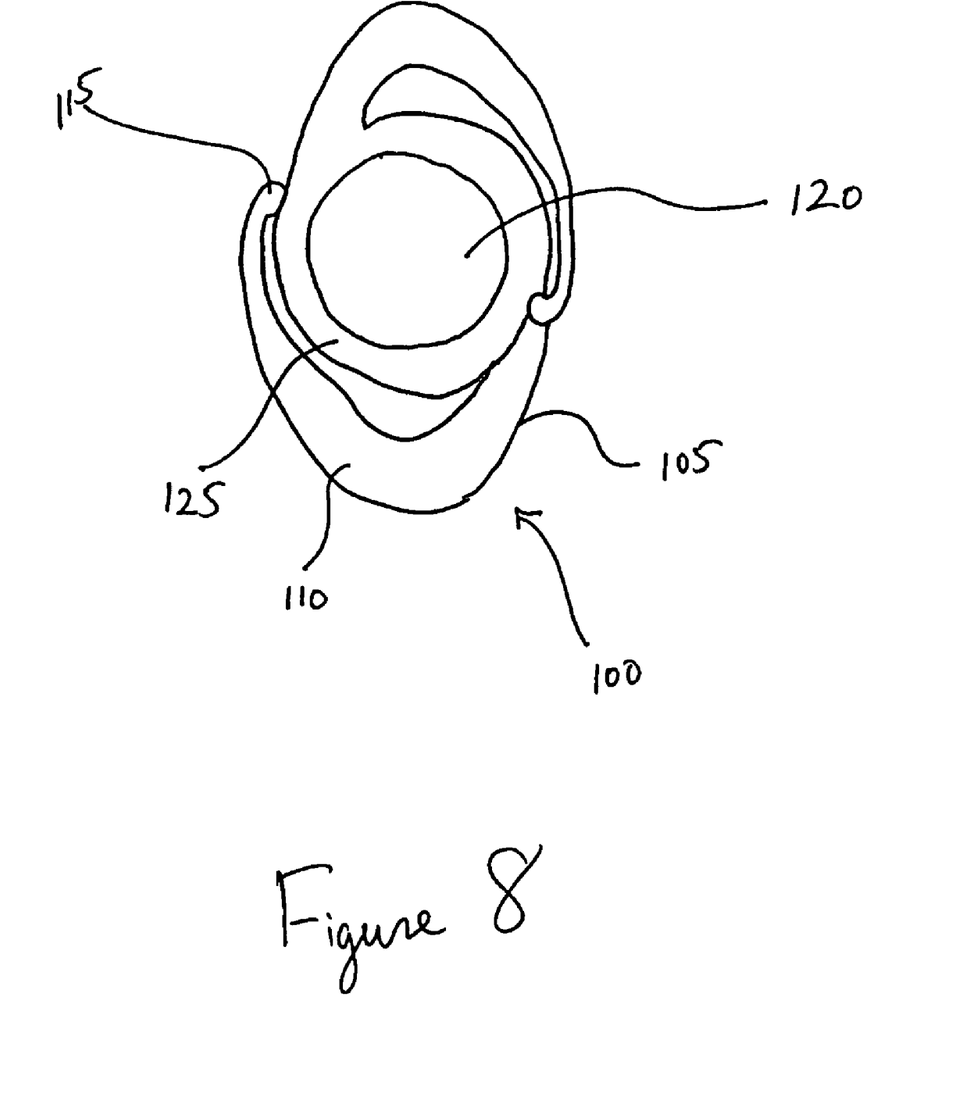
FIG. 8 is a side view of one embodiment of the leash attachment clamp of the present invention.

FIG. 8 is a side view of a holding means of the present invention. The holding means is designed to fit into the groove of the leash attachment device so that it can rotate around the leash attachment means without sliding down the leash. The bag holding means (100) has at least one place where a bag can be attached. Although FIG. 8 is shown having two places to attach a bag to the holding means, an embodiment having only one still falls within the spirit of the invention. The holding means (100) has a hollow core (120) that collars the groove of the leash attachment device. The holding means also has a spreadable arm (105) that has a flexible portion (110) that can be pulled back to produce a gap large enough to slide a bag into. At the end of the arm is a bulbous portion (115) that aids in keeping the arm (110) close to the body (125) of the holding means so as to prevent a bag from falling out of the holding means.

In another embodiment of the invention, no holding means is necessary at all, instead a bag can be tied around the leash attachment means directly. The leash attachment means prevents the bag from sliding down the leash and the tied bag can rotate about the leash attachment means and function as in the other embodiments of the invention.

In an alternative embodiment of the present invention, a leash can be constructed with the leash attachment device described above molded directly into the leash. In the event that the leash is constructed of metal, then the leash attachment can be soldered or fastened directly to the metal leash and in affect perform the same way as the leach attachment means described above.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. A leash attachment for carrying items comprising:
a leash attachment means having a first tubular member configured to mount to an outer surface of an elongated leash having a longitudinal axis;
a second tubular member rotatably mounted to an outer surface of said first tubular member and configured for rotation about said longitudinal axis of said elongated leash, said first tubular member and said second tubular member being disposed in a concentric orientation with said longitudinal axis;
said second tubular member further comprising a means configured for attaching an item connected to said second tubular member, said means for attaching an item having
at least one flexible extension arm attached to an outer surface of said second tubular member, said flexible extension arm having a memory and configured so that displacement of said at least one flexible extension arm from said outer surface of said second tubular member produces a gap between said second tubular member and said at least one flexible extension arm whereby an item placed in said gap is secured when said flexible extension arm is released to close said gap and an item positioned in said flexible extension arm rotates relative to said elongated leash about said longitudinal axis of said elongated leash to keep the item from tangling, wherein said at least one flexible extension arm is configured to be permanently attached to said outer surface of said second member at a first end and resting against said outer surface of said second member at a second end wherein a portion between said first and second ends bow away from said outer surface of said second member.

2. The leash attachment for carrying items according to claim 1 wherein said at least one flexible extension arm is a clip, said clip configured so as to grasp said item when positioned in a first position and to release said item when positioned in a second position.

3. The leash attachment for carrying items according to claim 1 wherein the leash attachment is made from a material selected from the group consisting of rubber, plastic, polyurethane, polyvinyl carbonate (PVC), metal, man-made materials, and combinations thereof.

4. The leash attachment for carrying items according to claim 1 wherein said flexible extension arm further comprises a bulbous portion configured for preventing said item positioned in said at least one flexible extension arm from becoming dislodged.

5. The leash attachment for carrying items according to claim 1 having a passageway wherein said first tubular member is configured to have a leash there through and a securing means configured to press said leash against said first tubular member so as to secure said leash in a fixed position.

6. A device comprising:
an elongated leash having a handle at one end and a free end configured to attach to a pet at another end, said elongated leash defining a longitudinal axis;
a first tubular member configured to mount to an outer surface of said elongated leash;
a second tubular member rotatably mounted to an outer surface of said first tubular member and configured for rotation relative to said elongated leash about said longitudinal axis of said elongated leash, the first tubular member and the second tubular member being disposed in a concentric orientation with said longitudinal axis; and
said second tubular member comprising a means for attaching an item connected to an outer surface of said second tubular member, said means for attaching an item having at least one flexible extension arm configured so that displacement of said at least one flexible extension arm from said outer surface of said second tubular member produces a gap between said second tubular member and said at least one flexible extension arm whereby an item placed in said gap is secured when said flexible extension arm is released to close said gap and an item positioned in said flexible extension arm rotates relative to said elongated leash about said longitudinal axis of said elongated leash to keep the item from tangling and wherein said at least one flexible extension arm is configured to be permanently attached to said second tubular member at a first end and resting against said outer surface of said second tubular member at a second end wherein a portion between said first and second ends bow away from said outer surface of said second tubular member.

7. The device according to claim 6 wherein said at least one flexible extension arm is a clip, said clip configured so as to grasp said item when positioned in a first position and to release said item when positioned in a second position.

8. The device according to claim 6 wherein the leash attachment is made from a material selected from the group consisting of rubber, plastic, polyurethane, polyvinyl carbonate (PVC), metal, man-made materials, and combinations thereof.

9. The device according to claim 6 wherein said flexible extension arm further comprises a bulbous portion configured for preventing said item positioned in said at least one flexible extension arm from becoming dislodged.

10. The device according to claim 6 wherein said first tubular member is configured to have a passageway to secure said leash there through in a fixed position.

* * * * *